United States Patent [19]

Shavit et al.

[11] Patent Number: 5,543,667
[45] Date of Patent: Aug. 6, 1996

[54] LOAD CONTROL FOR PARTIALLY INCREASING/DECREASING POWER USAGE

[75] Inventors: Gideon Shavit, Highland Park; Charles H. Culp, Vernon Hills, both of Ill.

[73] Assignee: Honeywell Inc., Minneapolis, Minn.

[21] Appl. No.: 342,665

[22] Filed: Nov. 21, 1994

Related U.S. Application Data

[63] Continuation of Ser. No. 998,189, Dec. 29, 1992, abandoned.

[51] Int. Cl.⁶ ........................................................ H02J 1/00
[52] U.S. Cl. .................................................. 307/39; 364/493
[58] Field of Search ............................... 307/39–41, 38; 364/492–493; 340/825.06–825.09; 379/102, 104, 105

[56] References Cited

U.S. PATENT DOCUMENTS

| | | | |
|---|---|---|---|
| 4,510,398 | 4/1985 | Culp et al. | 307/35 |
| 4,916,328 | 4/1990 | Culp | 307/39 |
| 5,017,799 | 5/1991 | Fishman | 307/34 |
| 5,168,170 | 12/1992 | Hartig | 307/35 |
| 5,243,225 | 9/1993 | Schveer | 307/38 |

Primary Examiner—Peter S. Wong
Assistant Examiner—Aditga Krishnan
Attorney, Agent, or Firm—Robert B. Leonard

[57] ABSTRACT

An add/shed load controller which will add/shed or increase/decrease the electrical usage of a load. A maximum decrease limit may be set for analog loads to insure that comfort is not overly affected due to load usage reductions.

9 Claims, 7 Drawing Sheets

LOAD CONTROL FOR PARTIALLY INCREASING/DECREASING POWER USAGE

This application is a continuation of application Ser. No. 07/998,189, filed Dec. 29, 1992 now abandoned.

BACKGROUND OF THE INVENTION

The present invention relates to a system for maintaining power consumption below a predetermined level and, more particularly, to an add/shed control for maintaining power consumption below a predetermined level where load power demand can be partially increased or decreased in different sequences depending upon the prioritization level given to each partial load upon the increase/decrease sequence assigned to each prioritization level.

Power utilities charge their customers according to a policy which is designed to both encourage energy conservation and to assess the cost for the extra power generating equipment which they must acquire and maintain to meet peak demands against those creating the peak demand. Accordingly, these power utilities will typically charge their customers at a first rate for power consumed below a first predetermined level, at a second rate the power consumed between the first predetermined level and a second predetermined level. If power consumption should exceed the second predetermined level, the utilities will charge what is in effect a penalty because they have had to acquire and maintain extra power generating equipment to meet those periods of unusually high demands. If all of utilities customers could be encouraged to eliminate excessive usage of power, the power utilities would then not be required to provide the extra equipment to generate the extra power during these peak demand periods and would be able presumably to pass along these savings to its customers through lower charges. In order to encourage economies and power consumption by their customers, the public utilities therefore, charging "penalties" on those customers who create peak demands.

In order to avoid these peak demand charges imposed upon them by their power utilities, power customers have employed automatic control systems which monitor power consumption within their facilities and then control the energization state of the power consuming loads within their facilities to maintain power consumption below some predetermined value in order to reduce the extra charges which would be imposed upon them if their energy usage increased the peak usage over a given time interval. These systems have typically taken the form of add/shed control systems which are designed to shed loads as power consumption approaches a predetermined level which is established by the customer. Alternatively, as power consumption begins to fall away from this predetermined level, previously shed loads can be added back on line so that they may be utilized by the customer.

Several different types of add/shed control systems have been proposed in the past. For example, the most common type of add/shed control system establishes a prioritized load order wherein the load having lowest priority will be shed first and the load having highest priority will be shed last. In such a system, if loads can be added back on line, the load having the highest priority will be added first and the load having the lowest priority will be added last. This is commonly referred to as a sequential routine.

Another add/shed system which is known adds/sheds loads on the basis of comfort fairness. That is, the loads associated with zones having conditions closest to set point will have the lowest priority and loads associated with zones having conditions the farthest away from the set point will have the highest priority. In this system, the loads having lowest priority will be shed first and the loads having highest priority will be shed last on the basis that it is more fair to shed the loads associated with the zones being closest to the comfort range first. Unfortunately, these systems have been inflexible because rarely can all the loads within a building be made to fit within one of these types of add/shed routines. For example, it is more desirable to shed the air handling fan systems within the building according to a comfort fairness routine than according to a sequential routine because a sequential routine is a fixed routine and will not necessarily result in fair control of the air handling fan systems. On the other hand, the outdoor lights certainly would not be shut on the basis of comfort fairness and it may also be determined that the outdoor lights are all of equal priority so that they could not be prioritized according to a sequential routine. Thus the outdoor lights may be shed using a rotational routine so that the first shed will be the first added.

As a result the new and improved add/shed control was developed by the assignee of the present invention and is fully disclosed in U.S. Pat. No. 4,510,398 which is assigned to the assignee of the present invention. In this system, an add/shed control is provided for maintaining power consumption below a predetermined level where the loads can be added and/or shed in different sequences depending upon the prioritization level given to each load and upon the add/shed sequence assigned to each prioritization level. Of the add/shed control disclosed in the aforementioned U.S. Pat. No. 4,510,398 adds flexibility to such systems, there remains substantial room for improvement. For example, the foregoing system does not provide for determining the anticipated future increase or decrease and power consumption of the building and as a result is unable to predict which loads must be shed in order to maintain the power consumption of a building below a predetermined level when future loads are to come on line. Hence, all of the add/shed control systems previously described are reactive systems which can only react to existing circumstances and are unable to maintain power consumption of a building below a predetermined level on a continuous basis based upon known future increases or decreases in power consumption.

In addition to the foregoing, such systems usually include a plurality of loads which are under control of "applications packages" which control these loads based upon a predetermined on and off schedule. When one of the loads assigned to an application package is to come on line, the system can only react to the load coming on line after it is on and drawing power which may cause the power consumption of the building to instantaneously exceed the desired predetermined level.

In order to overcome deficiencies noted in the prior art system, the system taught by U.S. Pat. No. 4,916,328 assigned to the assignee of the present invention, was created. The system taught in the '328 patent includes a means and method for determining the anticipated future increase or decrease in power consumption of the building. Selected loads are then added or shed in response to the measured total power consumption of the building and the anticipated future increase or decrease in power consumption of the building thereby continuously maintaining the power consumption of the building below the predetermined second level.

With the inclusion of multispeed fans and other analog loads to building automation systems, it is no longer necessary to shed entire loads to maintain power consumption below the second predetermined level. It is therefore an object of the present invention to maintain energy usage in a building below the second predetermined level by partly shedding loads which have multiple operational states.

SUMMARY OF THE INVENTION

The present invention is a system and a method for partially increasing/decreasing loads to maintain a building's power consumption below a predetermined level, each load being assigned to one of multiple types of increase/decrease routines, each routine controlling the partial increasing/decreasing of the loads in a different sequence.

In a preferred embodiment, the invention also includes structure or steps for determining the anticipated future increase and decrease in load by determining which loads will be required on or requested on in a next time period. The system or method then increases/decreases loads responsive to the measured total present power consumption of the building and the anticipated future increase or decrease in power consumption of the building. The power consumption is thereby maintained below the second predetermined level.

DETAILED DESCRIPTION OF THE PREFERRED EMBODIMENT

Figure 1:
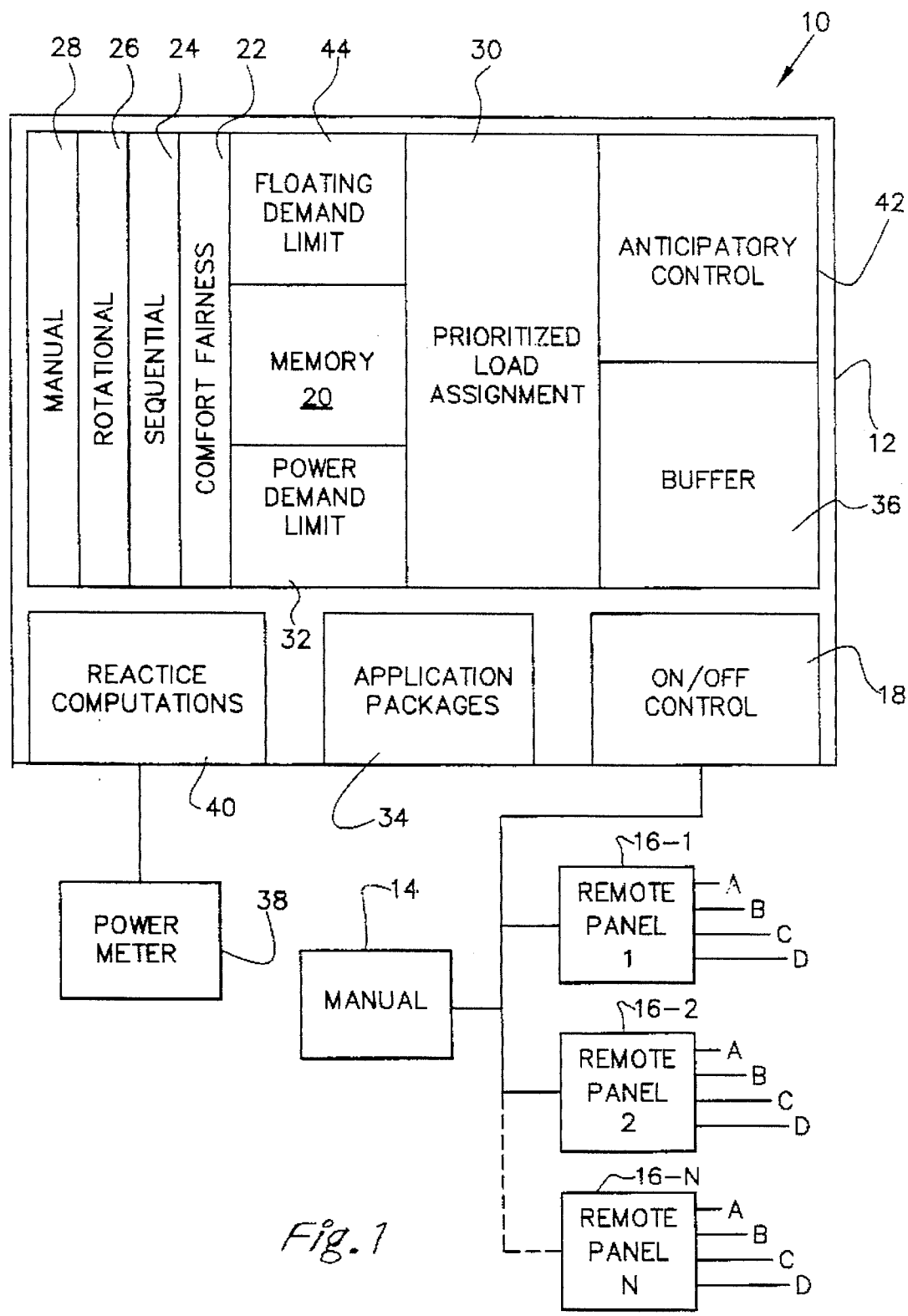
FIG. 1 is a functional block diagram of an add/shed control system embodying the present invention.

Referring now to FIG. 1, it shows, in functional block diagram form, an add/shed control system 10 embodying the present invention. The system 10 includes an add/shed processor 12, a CRT 14, and a plurality of remote panels 16-1 through 16-N.

Each remote panel can control, for example, 4 loads A–D. In such a system, if the add/shed processor 12 wishes to turn off load D associated with remote panel 16-N, the processor would construct a message addressing remote panel 16-N and instruct that panel to turn off load D through on-off control portion 18. Remote panel 16-1 through 16-N can be provided in any of the Delta or Excel Systems manufactured and sold by Honeywell Inc. The add/shed processor 12 is provided with the memory 20 which is arranged to control the loads associated with the remote panels according to one of the plurality of add/shed routines. These add/shed routines may be a comfort fairness routine 22, a sequential routine 24, a rotational routing 26 and a manual routine 28. Upon controlling the loads utilizing the routines 22, 24, and 26, the system is on automatic control and when the loads are controlled by routine 28, the system is under manual control. As will be appreciated by those skilled in the art, three automatic routines have been disclosed herein for completeness and that any number of automatic routines may be utilized without parting from the present invention.

The processor 12 also includes a prioritized load assignment add/shed orders section 30 which contains a plurality of shed orders for the system. Each load assigned to a shed order is identified by name, such as "chiller" and type, such as analog (e.g. Variable Air Volume box) or digital (e.g. single speed fan). The section 30 provides flexibility to the system wherein each routine 22, 24, 26, and 28 is assigned to at least one or more of the shed orders provided in section 30. Each load controlled by the remote panel 16-1 through 16-N is then assigned to one of the shed orders. The table below provides an example for routines that may be assigned to the shed orders. This example would work equally as well for add orders. Other possible sets of orders could use more or less routines than those shown here.

| | |
|---|---|
| Shed Order 1 | Rotational |
| Shed Order 2 | Sequential |
| Shed Order 3 | Comfort Fairness |
| Shed Order 4 | Rotational |
| Shed Order 5 | Sequential |
| Shed Order 6 | Comfort Fairness |
| Shed Order 7 | Rotational |
| Shed Order 8 | Sequential |
| Shed Order 9 | Comfort Fairness |
| Shed Order 10 | Rotational |
| Shed order 11 | Sequential |
| Shed Order 12 | Comfort Fairness |
| Shed Order 13 | Rotational |
| Shed Order 14 | Sequential |
| Shed Order 15 | Comfort Fairness |
| Shed Order 16 | Rotational |
| Shed Order 17 | Sequential |
| Shed Order 18 | Comfort Fairness |
| Shed Order 19 | Rotational |
| Shed Order 20 | Sequential |
| Shed Order 21 | Comfort Fairness |
| Shed Order 22 | Manual |

As can be noted from the table above, there are 22 total shed orders. 21 of these shed orders are for automatic control and one shed order is for manual control. The automatic control shed orders are arranged in groups of seven with each group including a rotational, sequential and comfort fairness routine. A lesser number or greater number of shed orders may be employed in practicing the present invention depending on the size of the total system and including the number of loads to be controlled and the number of different types of automatic control routines. For example, if only rotational and sequential automatic control routines are utilized, the system can be arranged to include 14 automatic shed orders and one manual shed order to provide a total of 15 shed orders.

In assigning loads to the shed orders, the loads having the lowest priority are preferably assigned to the lower number of shed orders. As will be seen hereinafter, the control system sheds loads from the lowest shed orders to the higher shed orders. As an example, if it is decided that a group of loads should have lowest priorities and should be shed sequentially, these loads should then be assigned a shed order 2. Not all shed orders need to be assigned loads. In the above example, shed order 1 will have no loads assigned to it. Hence, from the foregoing, it can be appreciated that shed order 1 is the first level to be shed and so on with shed order 21 being the last order to be shed. Shed 22 will be discussed hereinafter. If no loads are assigned to shed order 1, the system will simply skip to shed order 2 for shedding any loads which have to be shed.

The rotational routine is similar to a first shed, first add route. That is, when any load can be added back on-line, the load which was first shed will be the load first added. This routine can also be used to even out the shedding to even out the loads. For example, if there are three loads assigned to shed order 1, but only the first 2 loads are shed and then added back on-line, the next time loads have to be shed the system will begin with load 3.

The sequential routine operates on the principal that all loads in the shed order to which is assigned a sequential routine are prioritized within the shed order thus, the load which is first shed is the load having the lowest priority within the level. On the other hand, the load which is first added is the load last shed, that is, of the loads previously shed, the first load that will be added will be the load having the highest priority.

The comfort fairness routine is a floating type of sequential routine in nature. That is, the loads within the shed order are prioritized but they are prioritized on the basis of comfort fairness rather than a predetermined sequence. Comfort fairness prioritization dictates that the loads associated with the zone being closest to set point will have the lowest priority and loads associated with zones being farthest away from set point will have the highest priority. Thus, it is more desirable to shed loads associated with zones which are most near comfortable conditions than loads associated with zones being the farthest away from comfortable conditions.

Finally, the manual shed order routine at shed Order 22 requires that the human operator take action to indicate which loads assigned at this decrease order level should be shed. Along these lines, therefore, manual shed CRT 14 is provided so that the loads assigned to Shed Order 22 can be displayed if all of the loads assigned to Shed Orders 1 through 21 have been shed and if power consumption is still threatening to exceed the power demand limit (established in) within memory section 32.

The aforementioned U.S. Pat. No. 4,510,398 includes a description as to how loads can be shed according to the shed orders previously described. Reference may be had to U.S. Pat. No. 4,510,398 for this description. The disclosure of U.S. Pat. No. 4,510,398 is incorporated herein by reference.

In a typical system, not all of the loads to be controlled need be controlled by one of the routines 22, 25, 26, and 28. One or more of the loads will be controlled by the application packages section 34 which provides a predetermined schedule as to when the loads under control of the application packages should be turned on and turned off. The application packages section 34 in this regard may provide the predetermined schedule taking into account such parameters as maximum off times, minimum off times, optimum duty cycle, etc. As will be more fully described hereinafter, when the application packages section 34 desires to turn a load on or off through the ON/OFF control 18, it will post a request to that effect with the add/shed buffer 36. This enables the processor 12 to anticipate then the loads under the control of the application packages section 34 are desired to come on line or go off line.

In adding and shedding loads to maintain the total power consumption below a predetermined level, it is preferred that the system shed loads when the power consumption reaches a second predetermined level which is less than the predetermined level and add loads when the total power consumption falls below a third predetermined level which is less than the second predetermined level. As a result, the total power consumption of the building at any one time will be between the second and third predetermined levels which are both less than the predetermined level. This not only assures that the power consumption will remain below the predetermined level, but in addition, increases necessary hysteresis to the system to assure proper power consumption maintenance without abrupt discontinuities. The second and third predetermined power consumption limits or levels are stored in the power demand limit section 32 of processor 12 and are used for making comparisons to determine whether a load should be added or shed during the operation of the system.

To determine whether loads should be added or shed, the processor 12 is connected to a power meter 38 so that the processor 12 can read the current power consumption. Although any type of power meter can be used, the power meters supplied by utilities are adequate for the purposes of processor 12. These meters will typically provide KW pulses which are indicative of power consumptions and may also provide end of interval synchronization pulses to indicate the intervals over which power measurements are made. As will be seen in the flow charts hereinafter, the system adds and sheds loads during each of a plurality of successive discreet time intervals. These time intervals can range between, for example, one to three minutes. However, intervals shorter than one minute and longer than three minutes may also be appropriate under certain conditions.

Figure 2:
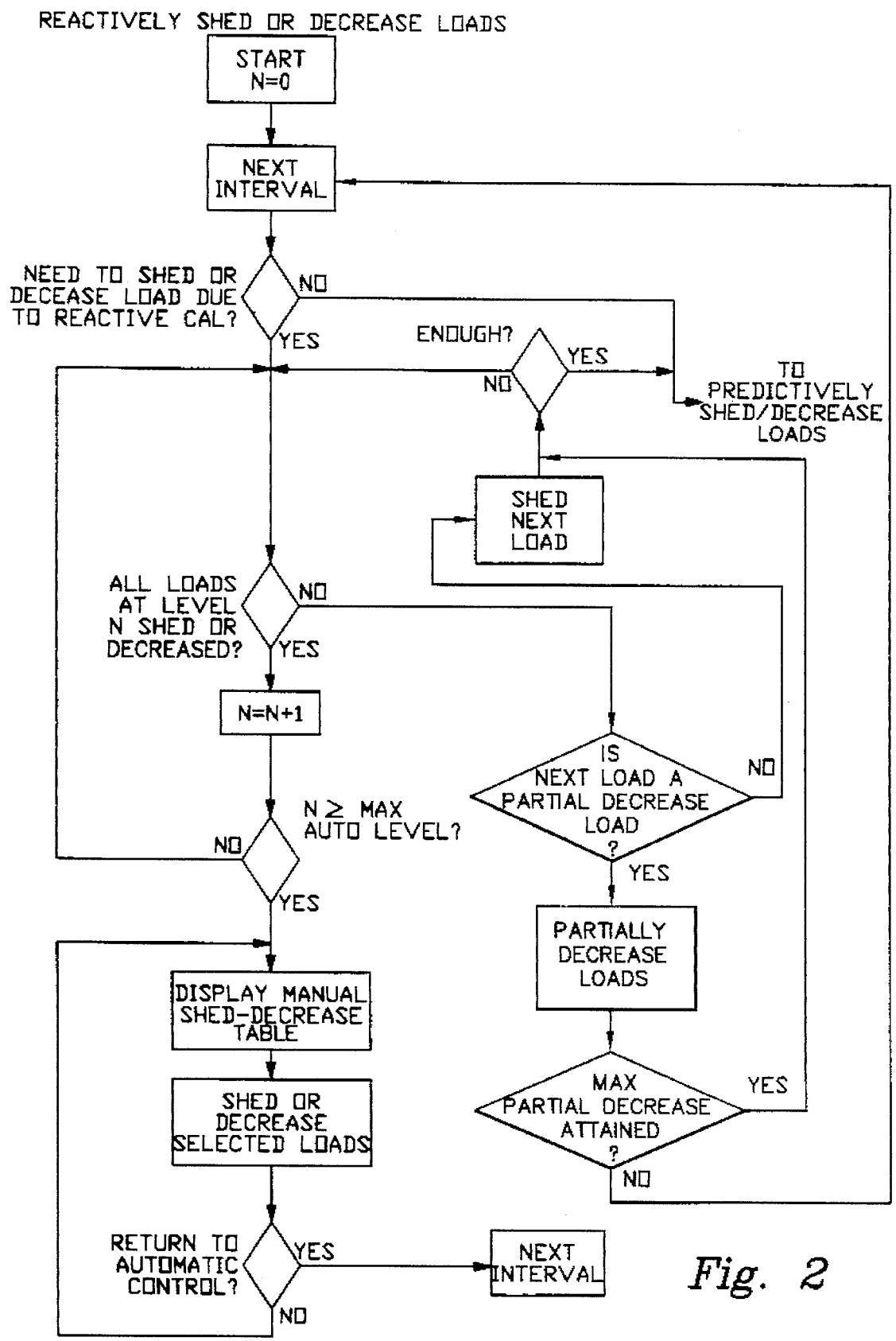
FIGS. 2 through 4 are flow charts for controlling the adding/shedding and the increasing/decreasing of the loads in accordance with the present invention.
Figure 3:
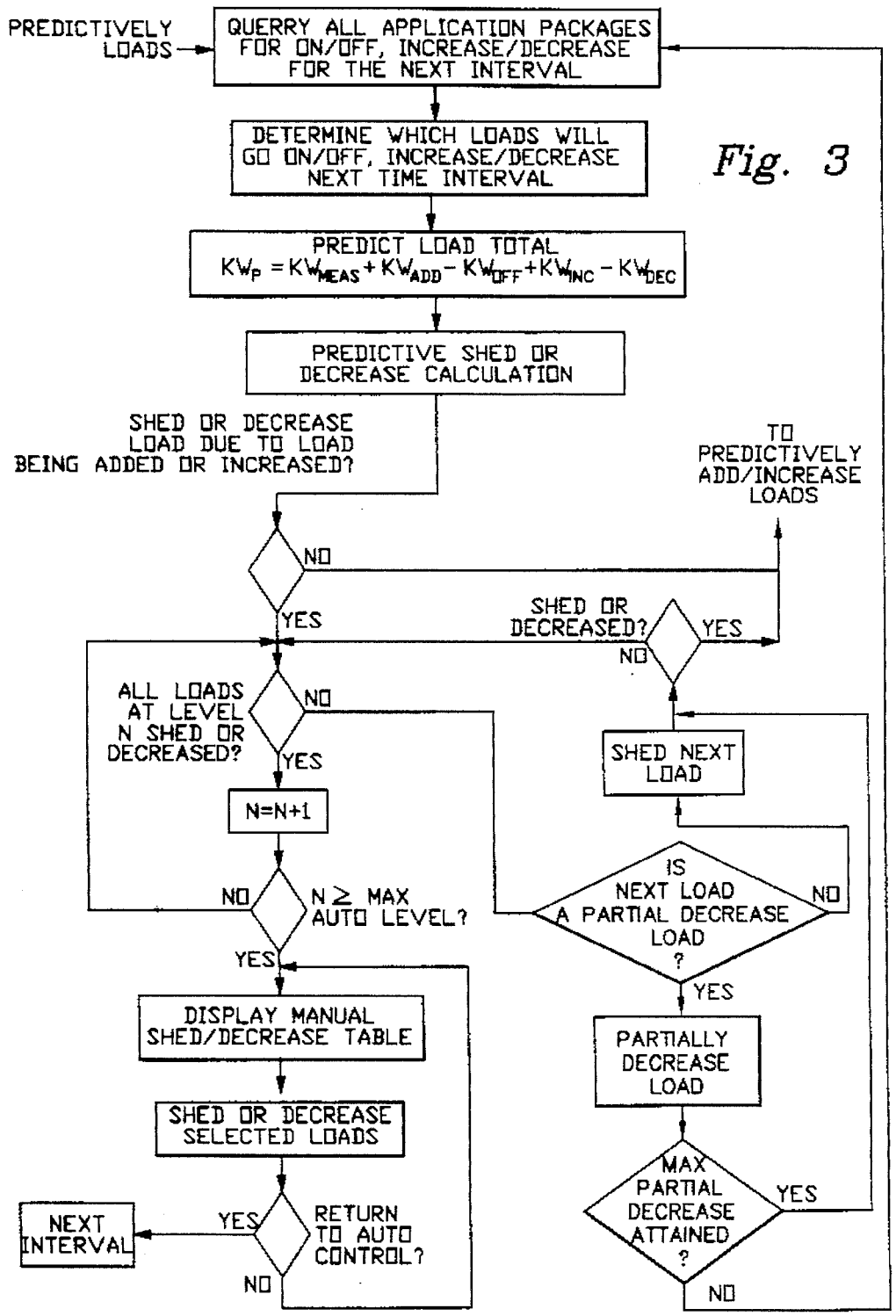
Figure 4:
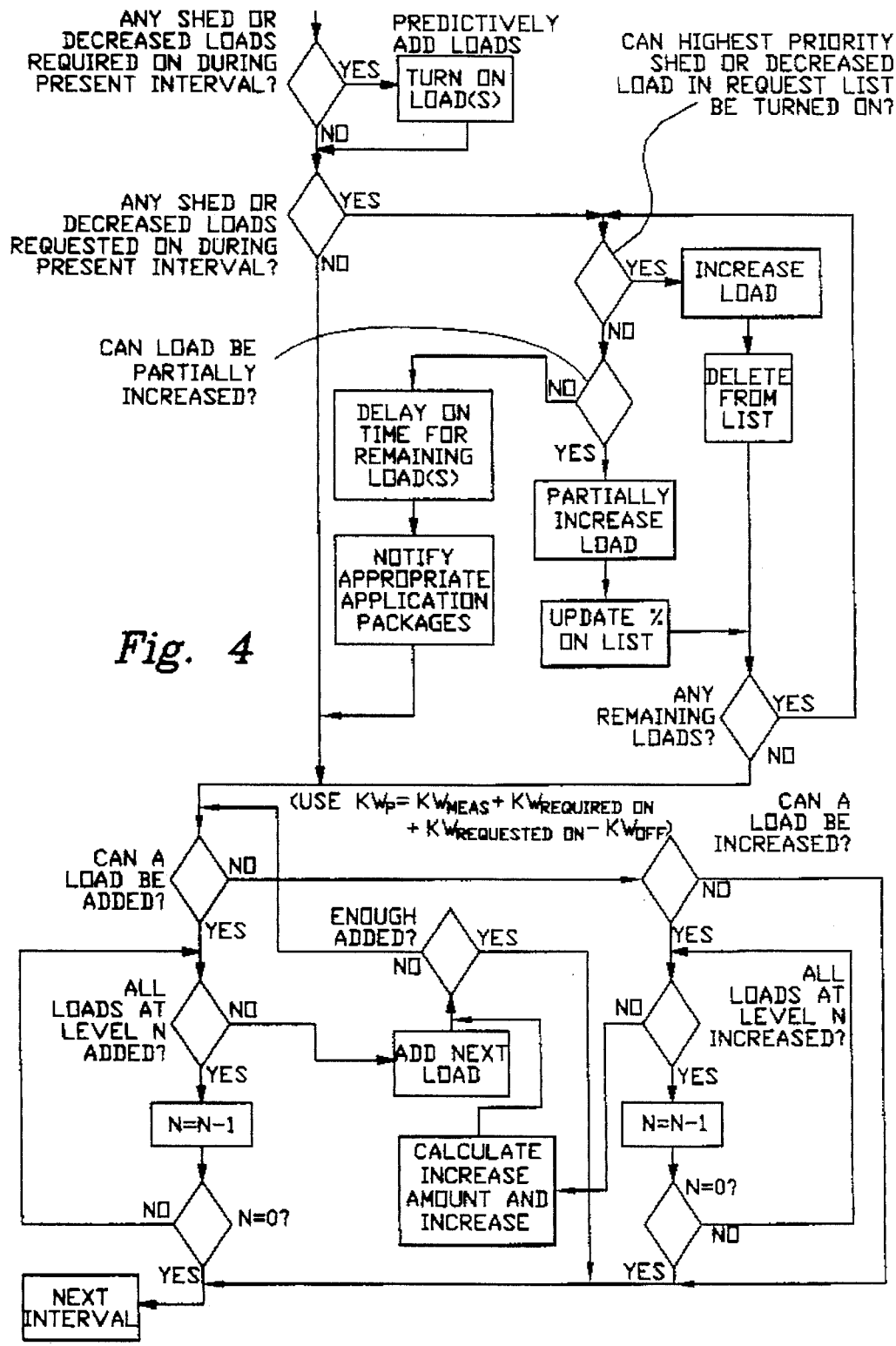

In accordance with the present invention, and as will be noted by the flow charts of FIGS. 2–4, the system, during each time interval, goes through a reactive shed stage wherein loads may be shed based upon current power consumption levels and then goes through predictive stages to predictively shed loads based upon information obtained during the immediately preceding time interval. In accordance with the alternative embodiment illustrated in the flow chart of FIG. 6, the system could be arranged to predictively shed and add loads based upon information obtained during a current or present time interval.

In order to reactively shed loads, the processor 12 includes a reactive shed computations section 40 wherein the current power consumption is compared against the second predetermined level to determine whether loads should be actively decrease. To predictively shed and add loads, the processor 12 includes an anticipatory control section 42. The section 42 is arranged to query an add/shed buffer 36 for on and off requests from the application packages section 34 to calculate the predicted power consumption level. In accordance with the preferred embodiment, the predicted power consumption calculated by the anticipatory control section 42 is the predicted power consumption level for the next successive interval and, in accordance with the alternate embodiment, the predicted power level is the predicted power consumption level for a current interval.

In describing the operation of the add/shed control system 10 as illustrated in the flow charts of FIGS. 2–6, it may also be mentioned that the processor 12 also includes a floating demand limit section 44 which may be utilized to increase energy savings by providing a further demand limit which is lower than the predetermined power demand limit so that certain non-essential loads can be shed for the express purpose of lowering energy costs regardless of whether the power consumption approaches the power demand limit. In such a case, the floating demand limit section is provided in order to shed the loads assigned to a preselected number of decrease orders. For example, as power consumption approaches the floating demand limit, the loads assigned to the first nine shed orders can be shed to maintain power consumption below the floating demand limit. If power consumption continues to increase above this limit, the floating demand limit floats upwards so that no other loads assigned to shed orders 10–22 will be shed. However, when the floating demand level approaches the power demand limit, the remaining loads assigned to shed orders 10–22 are eligible for decrease.

Referring now to the flow charts of FIGS. 2–4, each time an add/shed interval is entered, such as on power up, the value N, which represents the shed order, is set to zero. The system will then determine, as shown in FIG. 2, whether any loads have to be reactively shed or decreased. In other words, the processor will read the current power consumption in the present time interval and compare it to the second predetermined power consumption limit or in other words the power consumption decrease limit. If no loads should be shed or decreased, the processor will more forward to the predictive shed stage.

If loads have to be shed or decreased, the processor will determine whether or not all loads at the level N, which was initially set to zero, have been shed or decreased. Since there is no shed order zero, the answer must be that all loads at this order have been shed or decreased. N is accordingly incremented to 1 and the system will then determine if all loads at this shed order have been shed or decreased. If they have not, the processor will then determine if the next load is a partial shed load which can be decreased. If the answer is yes, the load is decreased, and the processor determines whether the maximum partial decrease for that load has been attained. If yes, the processor then returns to determine if enough load has been shed or decreased. If the maximum partial decrease for a load has not occurred, the processor returns to wait for the next interval.

If the load to be shed was not a partial shed load, then the processor sheds the load in its entirety and again will test whether or not enough load has been shed or decreased. If enough load has been shed or decreased, the system will then move forward to the predictive shed stage. Note that all shedding or decreasing will occur in accordance with the procedure set out in FIG. 5.

If enough load has not been shed or decreased, the processor will then test to determine whether there are any more loads at that level to be shed or decreased. If all loads at that level have been shed or decreased as to the partial decrease limit, the processor will increment to the next level by adding one to the old value for N and test whether the new N value is less than the maximum automatic shed level number, which, in this embodiment, is 21. If the N value is less than 21, the system will determine whether or not there are any loads at that level to be shed or decreased. If there are current loads remaining at that level to be shed or decreased, the system will shed or decrease the next load and test whether or not enough load has been shed or decreased.

During this procedure, two circumstances will eventually evolve. If enough load has been shed or decreased prior to reaching shed level 22, the system will move forward to the predictive shed stage. On the other hand, if enough load has not been shed or decreased and the system reaches shed order 22, and if more loads still need to be shed or decreased, the system will display the loads which can be manually shed or decreased on the manual shed CRT 14. The operator then has the option to shed or decrease which ever loads he chooses. After shedding or decreasing the selective loads, the operator then determines whether the system should return to automatic control. If he determines that the system should return to automatic control, the system will pause and wait for the beginning of the next interval. If the operator determines that the system should not return to automatic control due to extremely high power consumption levels, the system will return to display the loads which can still be manually shed or decreased on the manual shed CRT 14.

If the system moves forward to the predictive shed stage, the value of N should be 21 or less. Upon entering the predictive shed stage, the processor will query all application packages for on and off add/shed and increase/decrease requests for the next time interval. As previously described, the application packages section 34 of the processor 12 will typically control a plurality of the loads in the system. When the application packages section 34 desires to turn a load on or off or increase or decrease load, it first posts a suitable on or off or increase or decrease request in the add/shed buffer 36. At this state of the process, the processor through the anticipatory control 42 accesses the add/shed buffer 36 to determine if any such on or off or increase or decrease requests have been posted therein by the application packages section 34. Upon accessing the add/shed buffer 36, the processor determines which loads will go on or off or increase or decrease during the next time interval. It will also determine the amount of power consumption represented by the loads which are requested to be turned on or off or loads which have energy consumption increase or decrease by the application packages section 34. Such power consumption data may be stored in the memory 20 or in the add/shed buffer 36.

The processor will then predict the anticipated power consumption of the system for the next time interval. It will do so by reading the current power consumption and adding to it the power consumption of the loads which are requested or required on and loads which are requested or required to increase during the next time interval and subtracting the power consumption of the loads which are to be turned off or decreased during the next time interval.

The processor will then determine whether any loads have to be shed or decreased due to the loads being added or increased during the next time interval. If no loads need to be shed or decreased predictively due to the loads being added or increased during the next time interval, the processor will move forward to the predictive add stage.

If loads need to be shed or decreased due to loads being increased during the next time interval, the processor will then determine whether all loads at the present shed order have been shed or decreased. If not, the processor will then predictively shed or decrease the next load in accordance with the procedure shown in FIG. 5 and determine whether enough load has been shed or decreased. The process for predictively shedding or decreasing loads is similar to that previously described with reference to FIG. 2. If enough load has been shed or decreased, the processor will move forward to the predictive add or increase stage. If enough load has not been shed or decreased, the system will once again determine whether all loads at the current shed order have been shed or decreased. If all loads at the current shed order have been shed or decreased, the system will increment the shed order number by one. The system then determines whether the new current shed order level number is greater than the maximum number of automatic shed order levels. If it is not, the process repeats itself by determining whether all levels at the new incremented shed order level have been shed or decreased. If the new shed order level is greater than the maximum number of automatic shed order levels, in this preferred embodiment 21, then the system will enter in to the manual mode by displaying those loads which can be shed or decreased manually on the manual shed CRT 14. Selected ones of the manually controlled loads will then be predictively shed or decreased in the same procedure as described with respect to the flow chart of FIG. 2.

From the foregoing flow chart of FIG. 3, it can be noted that the system predictively sheds or decreases loads to accommodate loads which are to be added or increased during the next time interval. The loads to be added or increased during the next time interval are determined during the present time interval. As a result, the system is capable of anticipating future adds or increases in power consumption and accommodating such adds or increases by predictively shedding or decreasing loads to assure that the total power consumption of the system during the next time interval will not exceed the predetermined power consumption limit.

If enough load has been predictively shed or decreased without reaching the manual shed order level, the system will move forward to the predictive add stage shown in FIG. 4. The system will predictively add or increase loads by first determining whether any loads are required to be turned on or increased during the present interval. These loads were determined to be required turned on or increased during the time period immediately preceding the present interval. If any loads are required to be turned on or increased during the present interval, the system will act on those loads accordingly.

If no loads are required turned on during the present interval, the processor will then determine whether any loads have been requested to be turned on or increased during the present interval by the application packages section 34. If there has been such a request, the processor will determine whether the highest priority load in the request list posted by the application packages section 34 can be turned on or increased. In making this determination, the processor compares the present measured power consumption to the third level which is the add load level. If the highest priority load can be turned on or increased, the system will turn on or increase the load and delete that load from the posted list. The system will then determine whether any loads remain on the posted list. If loads requested to be turned on or increased remain on the list, the system will then determine again whether the highest priority load remaining on the list can be turned on or increased.

If originally the system determined that the highest priority load on the request list will be increased then the load will be increased and the percentage of energization list will be updated to show the current energization status of the load. If it is not possible to increase the load, the system will delay the increasing of the load and notify the appropriate application package within the application packages section 34 that the increase time is being delayed. The Increase request will not be deleted from the list and, during the next time interval, the system will once again determine whether the loads requested to be increased can be increased.

If there were originally no loads requested to be turned on or increased, if no loads requested to be turned on or increased could be turned on or increased, or if there were no loads remaining on the list to be turned on or increased, the system will then determine whether one of the loads which has been shed or decreased can be added or increased. In making this determination, the processor utilizes the anticipated or predicted power consumption for the next time interval which equals the measured current power consumption plus the power consumption of the loads required or requested on or increased during the next time interval minus power consumption of the loads which are to be turned off or decreased during the next time interval. If a load cannot be added, the system will then ask if a load may be increased. If possible, the amount to be increased is calculated and then increased. If an increase of the load is not possible, the system will pause until the beginning of the next time interval.

If a load can be added or increased, the system will then determine whether all loads at the current shed order level have been added or increased. If not, the system will add or increase the next load and then determine whether enough load has been added or increased. If enough load has been added or increased, the system will pause and await the beginning of the next time interval. If enough load has not been added or increased, the system will once again determine if all loads at the current shed order level have been added or increased. If all loads at the current decrease order level have been added or increased, the system will then decrement the current shed order level number by one.

The system then determines whether shed order level number N is equal to zero. If it is, this indicates that there are no loads remaining to be added and the system pauses and awaits for the next time interval to begin. If the shed order level N is not equal to zero, the system then returns to determine whether all loads at the current shed order have been added or increased. When enough load has been added or increased, or when there are no loads remaining to be added or increased, the system pauses and awaits the next time interval.

As can be noted from the foregoing, during each time interval, the system determines whether it should reactively shed or decrease loads based upon the present power consumption and then determines whether loads should be predictively shed or decreased or added or increased based upon the present total power consumption and the anticipated future adding or shedding or decrease in power consumption for the next time interval. The reactive shedding or decreasing accommodates uncontrolled loads which are not under the control of the shed orders or the application packages section of the processor. As a result, if an uncontrolled load should go on to threaten the power consumption level rising above the predetermined level, the system will shed or decrease enough controlled loads to preclude the total power consumption to exceed the predetermined level. In providing the predictive shedding or decreasing and adding or increasing of loads, the system is capable of shedding or decreasing enough load to accommodate loads which are to be added or increased during the next time interval. In addition, if loads can be added or increased, they will be added or increased based upon anticipated sheds or decreases in the power consumption for the next time interval. As a result, the system reactively sheds on decreases and predictively sheds or decreases and adds or increases loads to continuously maintain the power consumption below the predetermined level.

Figure 5:
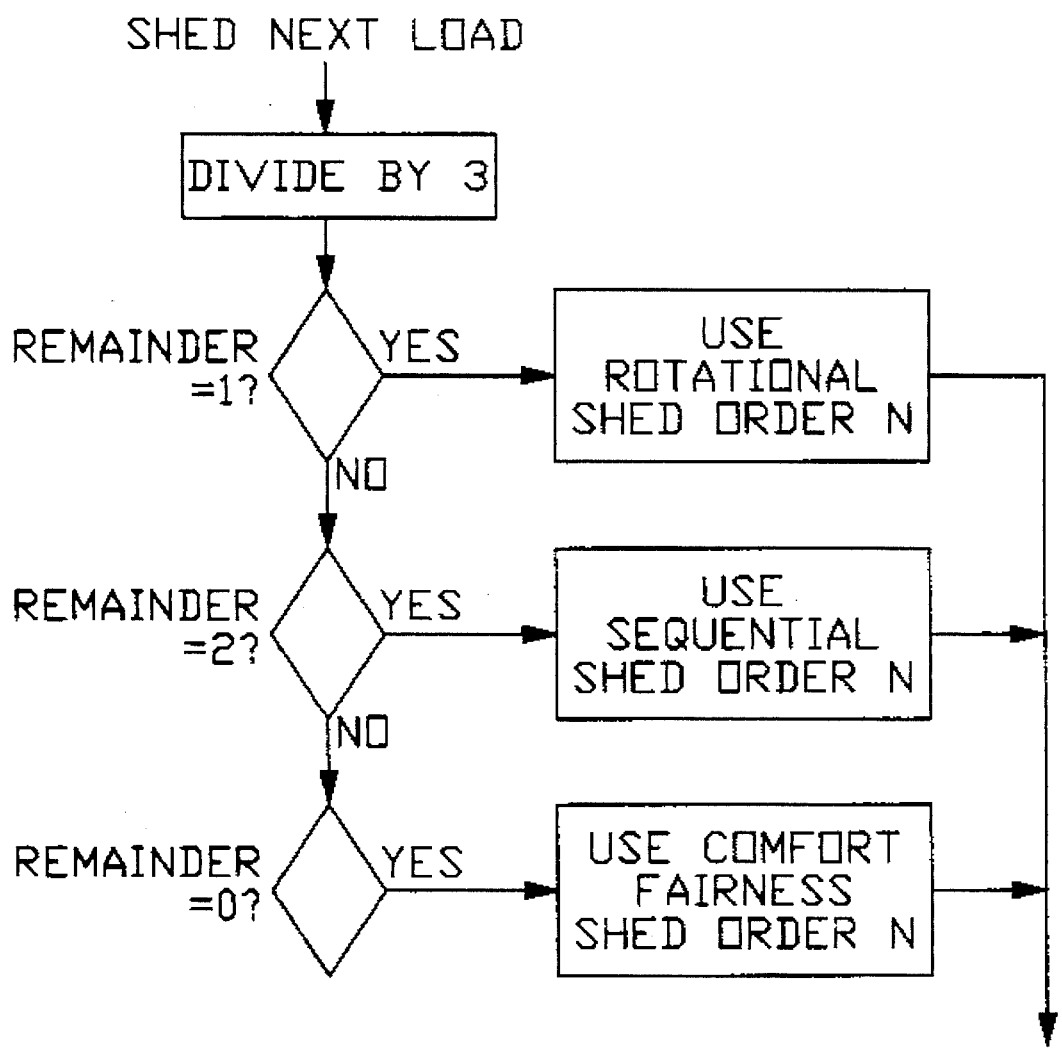
FIG. 5 is a flow chart for determining which add/shed routines apply to which loads.

The "shed next load" routine is shown in FIG. 5. If the next load is to be decrease, processor 12 will divide the value of N by the number of different automatic routines established by the system, which is three in accordance with this preferred embodiment. If there is a remainder of one, then the rotational shed routine is utilized. If there is no remainder, the comfort fairness routine is used. According to the process shown in FIG. 5, all shed orders in the series 1, 4, 7, etc. will be assigned to the rotational routine, all shed orders in the series 2, 5, 8, etc. will be assigned to the sequential routine, and all shed orders which are even multiples of three will be assigned to the comfort fairness routine. The rotational and sequential routines both involve predetermined sequences. The comfort fairness routine involves a variable sequence and may be similar to the routine described in U.S. Pat. No. 4,377,401. Although it is not shown, the "add next load" routine will be similar to that shown in FIG. 5.

Figure 6:
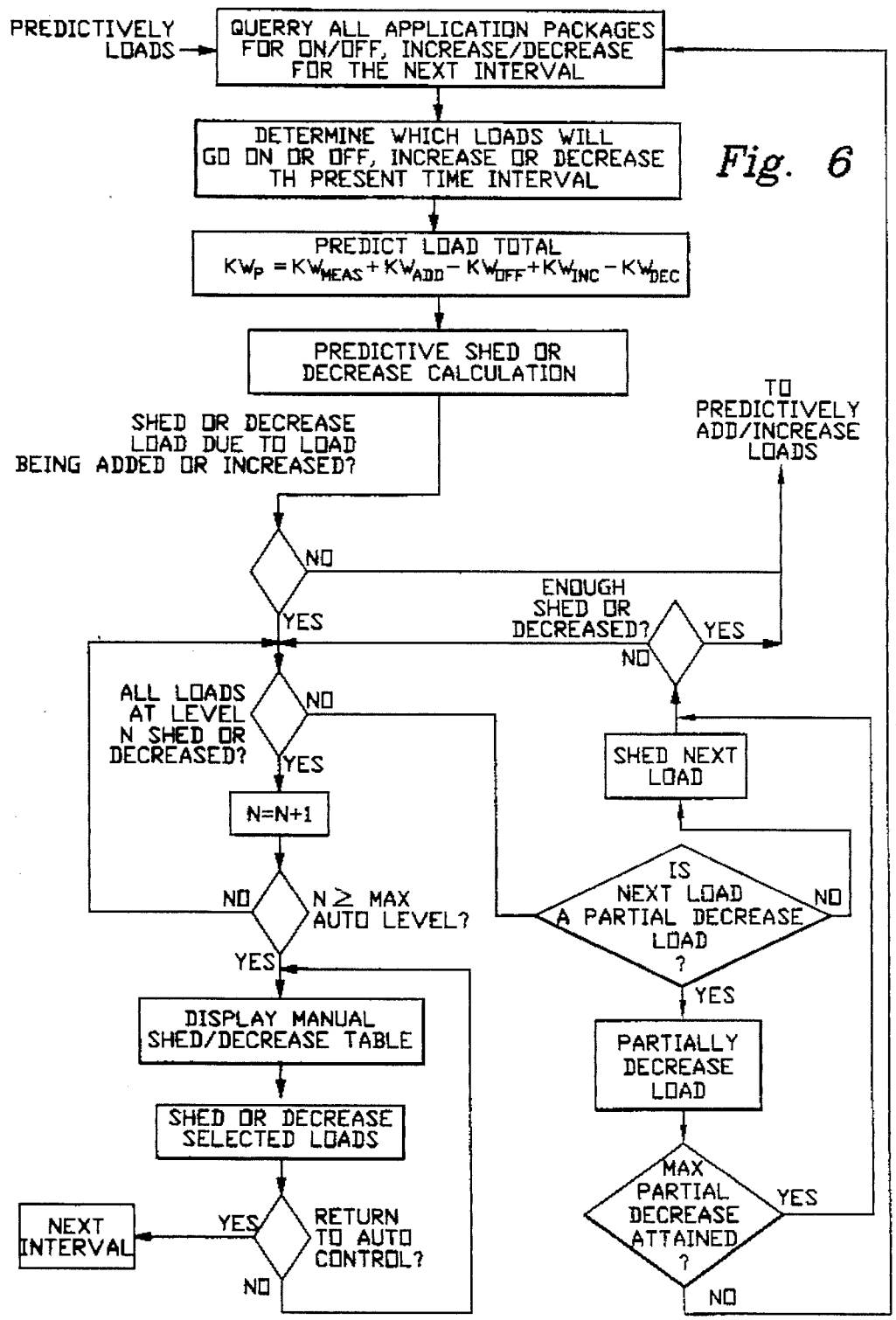
FIG. 6 is a flow chart for predicatively partially shedding and decreasing loads in accordance with an alternative embodiment of the present invention.

Referring now to FIG. 6, it illustrates a flow chart for predictively shedding loads in accordance with an alternative embodiment of the present invention. The flow chart of FIG. 6 can be substituted for the flow chart of FIG. 3.

In accordance with this alternate embodiment, the system predictively sheds or decreases loads by first querying all application packages for on or off or increase or decrease requests for the present interval. The system then determines which loads will go on or off or increase or decrease during the present time interval and determines anticipated or predicted power consumption of the system based upon the currently measured power consumption plus the power consumption of the loads to be added or increased during the present interval minus the power consumption plus the power consumption of the loads to be added or increased during the present interval minus the power consumption of the loads to be turned off or decreased during the present interval. The system, in the anticipatory control 42, then calculates the predicted power consumption and then determines whether loads should be shed or decreased and which loads should be added or increased during the present interval based upon the power consumption increase or decrease predicted for the present interval. In all other respects, the processor operates the same as shown in FIG. 3.

As will be noted from this alternative embodiment, the system is arranged for reactively shedding or decreasing loads based upon power consumption in a present time interval and is arranged for shedding or decreasing and adding or increasing loads during the present interval based upon anticipated power consumption sheds or decreases or adds or increases determined in the present time interval. As a result, while the system of the preferred embodiment looks ahead to the next time interval for making the anticipated power consumption determination, the system in accordance with the alternative embodiment looks to the present interval for making the anticipated power consumption determination.

The add/shed controller may operate directly or indirectly on a load. An example of an indirect operation would be to reset the temperature of a process which would then have the effect of reducing the energy consumption. A simplified example of direct reduction or increase of power usage would involve: 1) determining how much power to add or shed; 2) calculating the amount of increase or decrease in output of a selected device corresponds to the require energy change; and 3) change the operating point of the device.

Figure 7:
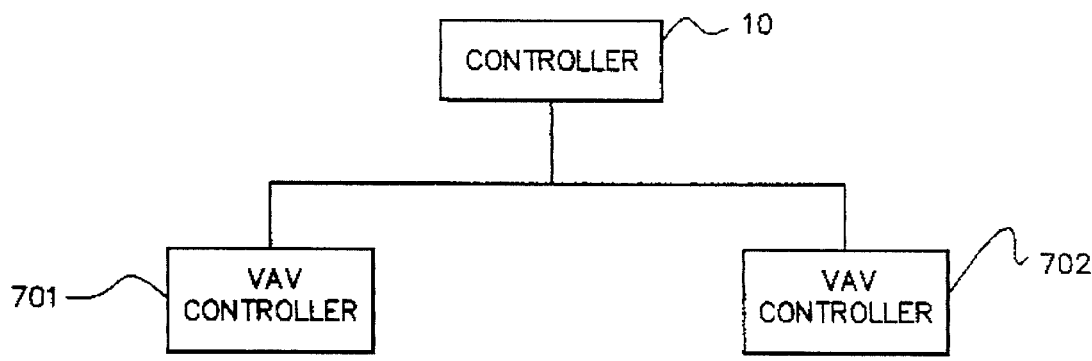
FIG. 7 is a block diagram showing a controller connected to variable air volume boxes.
Figure 8:
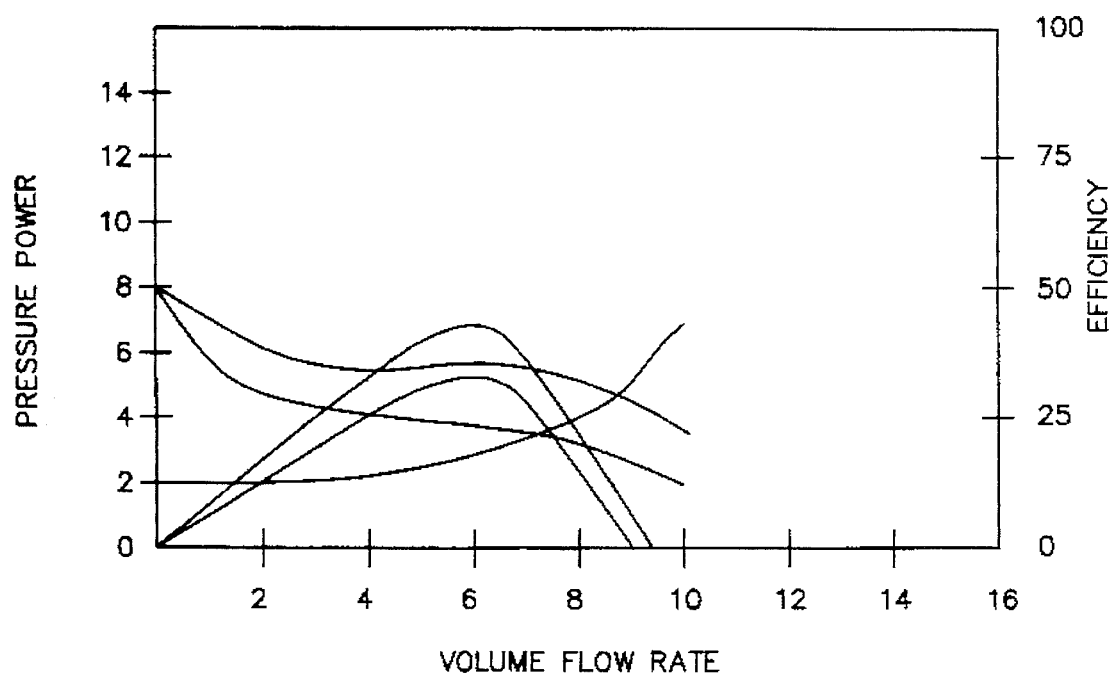
FIG. 8 show representative fan curves.

As an example of direct operation, a controller 700 is connected to the Variable Air Volume (VAV) boxes 701 and 702 as shown in FIG. 7. The fan curves of FIG. 8 could be used to determine how much energy savings occur by reducing the fan speed of the VAV boxes by a chosen amount.

As can be seen from the foregoing, the present invention provides a new and improved add/shed system for adding, increasing, shedding and decreasing loads to maintain the power consumption of a building below,the predetermined level. The system includes a first means for reactively shedding or decreasing loads based upon the current measured power consumption of the building and second means for determining the anticipated future increase or decrease of power consumption of the building and for adding or increasing and decreasing loads responsive to the building and the anticipated future increase or decrease in power consumption of the building. By virtue of the reactive shedding or decreasing of loads and the predictive adding or increasing and decreasing of loads, the system of the present invention is capable of continuously maintaining the power consumption of the building below a predetermined level. In accordance with the preferred embodiment, the system determines which of the loads will be on or off or increases or decreased during the next successive time interval and, in accordance with the alternative embodiment, the system determines which of the loads will be on or off or increased or decreased during the present time interval.

In addition, by reactively shedding or decreasing loads, the system is capable of accommodating loads which are not controlled by shedding or decreasing enough controlled load to maintain the power consumption of the building below the predetermined level even though uncontrolled loads may be turned on. Also, the system of the present invention is capable of delaying the on or increase time of a load until the load can be turned on or increased without exceeding the predetermined power consumption level. This is accomplished by the posting of on and off or increase and decrease requests with the system processor and arranging the system so that an on or increase request can be delayed by the second means to alter the control of those loads by turning on those loads when the predetermined power consumption level will not be exceeded.

In addition to the foregoing, the system of the present invention also provides flexibility in assigning loads to various shed routines. Each load may be assigned a priority with respect to each of the other loads and each of the loads may be combined in a group of loads having a given priority and each load of the group may be assigned a priority with respect to each other load of the group. In this regard, each routine controls the adding, increasing, shedding and decreasing of the loads in a different sequence and the processor determines which type of the multiple types of routines is assigned to each load and adds, increases, sheds or decreases each load according to its assigned routine. As a result, the present invention provides an add/shed system which not only incorporates flexibility but in addition provides improved and distinct advantages over prior systems by providing both reactive and predictive adding, increasing, shedding and decreasing of loads to maintain the power consumption of a building below a predetermined level.

While particular embodiments of the present invention have been shown and described, modifications may be made, and it is therefore intended in the appended claims to cover all such modifications as may fall within the true spirit and scope of the invention.

The foregoing has been a description of a novel and non-obvious building system controller which is capable of adding, increasing, shedding and decreasing loads. The inventors do not intend the foregoing description to limit the scope of their invention, but instead define the limits of their invention in the claims appended hereto.

We claim:

1. A system for adjusting component loads to increase or decrease energy usage of a total load to maintain power consumption below a predetermined level operative at sequential time intervals, wherein each component load is assigned to at least one of multiple types of add/shed or increase/decrease routines, each routine controlling the addition, partial increase, shedding or partial decrease of said components loads, said system comprising:

a power meter connected to measure the power usage of each component load; and processor means connected to the total load and connected to said power meter, said processor means determining how much and which of the component loads should be increased/decreased or add/shed to maintain power consumption below said predetermined level based on the add/shed or increase/decrease routine assigned to each load, said processor means adding, shedding, increasing and decreasing each load according to its assigned routine, and wherein said processor performs said addition, partial increase, partial decrease, or shedding of said components loads to accommodate said predetermined level at a given time interval.

2. The apparatus of claim 1, wherein:

said processor means includes memory means for storing a decrease limit for said total load, said processor means adapted to not exceed said decrease limit when decreasing the total load.

3. The apparatus of claim 2, wherein:

said processor means calculates a required power consumption reduction necessary to maintain power consumption below said predetermined value, said processor means decreasing total load to accomplish said power consumption reduction.

4. The apparatus of claim 3, further comprising:

a plurality of loads having on and off states connected to said processor means, said processor means adding/shedding said loads having on and off states along with the loads having multiple levels of energy usage that can be increased or decreased by said processor.

5. The apparatus of claim 4, wherein:

there are a plurality of loads having multiple levels of energy usage and said loads having on and off states are arranged in a queue within each of the add/shed routines, said processor means identifying groupings of at least two consecutive partial loads having multiple levels of energy usage within each queue, said processor equally decreasing energy usage for all loads having multiple levels of energy usage within a grouping.

6. The apparatus of claim 3, wherein:

there are a plurality of loads having multiple levels of energy usage each of which is associated with a comfort sensor which produces a comfort signal indicative of a comfort index value;

said processor means includes memory for storing a comfort fairness factor, said processor means comparing all of said comfort index values associated with the loads having multiple levels of energy usage within one of said routines, said processor means decreasing said loads having multiple levels of energy usage in order of greatest to least difference between said associated comfort index value and said comfort fairness value until said desired power consumption reduction is achieved.

7. The apparatus of claim 3, wherein:

there are a plurality of loads having multiple levels of energy usage at least one of which is a variable air volume controller having an adjustable air flow.

8. The apparatus of claim 7, wherein:

said memory stores a maximum air flow deviation for each of said variable air volume controllers, said processor means adjusting said adjustable air flow by no more than said maximum temperature deviation when partially decreasing load.

9. A system as set forth in claim 1 wherein said processor accommodation of said predetermined level considers the anticipated load at the next time interval.

* * * * *